US009936482B2

(12) United States Patent
Jung et al.

(10) Patent No.: US 9,936,482 B2
(45) Date of Patent: Apr. 3, 2018

(54) METHOD AND APPARATUS FOR DELAYING AUTONOMOUS RESOURCE FALLBACK FOR D2D OPERATION IN WIRELESS COMMUNICATION SYSTEM

(71) Applicant: LG ELECTRONICS INC., Seoul (KR)

(72) Inventors: Sunghoon Jung, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/113,042

(22) PCT Filed: Feb. 4, 2015

(86) PCT No.: PCT/KR2015/001157
§ 371 (c)(1),
(2) Date: Jul. 20, 2016

(87) PCT Pub. No.: WO2015/119428
PCT Pub. Date: Aug. 13, 2015

(65) Prior Publication Data
US 2017/0013595 A1    Jan. 12, 2017

Related U.S. Application Data

(60) Provisional application No. 61/935,722, filed on Feb. 4, 2014.

(51) Int. Cl.
*H04W 72/02* (2009.01)
*H04W 72/08* (2009.01)
(Continued)

(52) U.S. Cl.
CPC .......... *H04W 72/02* (2013.01); *H04W 8/005* (2013.01); *H04W 72/085* (2013.01); *H04W 88/04* (2013.01)

(58) Field of Classification Search
CPC ... H04W 72/02; H04W 72/085; H04W 88/04; H04W 8/005
See application file for complete search history.

(56) References Cited

U.S. PATENT DOCUMENTS

| 2011/0134774 A1 * | 6/2011 | Pelletier .............. H04W 52/365 370/252 |
| 2012/0157146 A1 | 6/2012 | Theisen et al. |

(Continued)

OTHER PUBLICATIONS

Ericsson, "On Out of Coverage Definitions for D2D", 3GPP TSG RAN WG1 Meeting #75, R1-135809, Nov. 2, 2013, 4 pages.
(Continued)

*Primary Examiner* — Frantz Bataille
(74) *Attorney, Agent, or Firm* — Lee Hong Degerman Kang Waimey

(57) ABSTRACT

A method and apparatus for performing device-to-device (D2D) transmission in a wireless communication system is provided. A user equipment (UE) determines that it is out of coverage (OOC). Even though the UE is OOC, the UE continues to perform D2D transmission by using D2D resources for in-coverage under a specific condition. Based on a specific condition, if the UE determines that is in coverage before the specific condition is met, the UE performs D2D transmission by using the D2D resources for in-coverage. If the specific condition is met while the UE is OOC, the UE performs D2D transmission by using the D2D resources for OOC.

14 Claims, 19 Drawing Sheets

(51) Int. Cl.
*H04W 8/00* (2009.01)
*H04W 88/04* (2009.01)

(56) References Cited

U.S. PATENT DOCUMENTS

2013/0171995 A1* 7/2013 Fujishiro .............. H04W 28/08
  455/441
2015/0117309 A1* 4/2015 Gage .................... H04W 8/005
  370/328

OTHER PUBLICATIONS

3rd Generation Partnership Project, "Technical Specification Group RAN; Study on LTE Device to Device Proximity Services-Radio Aspects; (Release 12)", 3GPP TR 36.843 V1.0.0, Nov. 2013, 32 pages.
Qualcomm Incorporated, "D2D synchronization for out of coverage and partial network coverage", 3GPP TSG-RAN WG1 #74bis, R1-134624, Sep. 28, 2013, 6 pages.
General Dynamics Broadband UK, "ProSe device-to-device operation when out of network coverage", 3GPP TSG-RAN1#74, R1-133439, Aug. 10, 2013, 5 pages.

* cited by examiner

METHOD AND APPARATUS FOR DELAYING AUTONOMOUS RESOURCE FALLBACK FOR D2D OPERATION IN WIRELESS COMMUNICATION SYSTEM

CROSS-REFERENCE RELATED TO APPLICATIONS

This application is the National Stage filing under 35 U.S.C. 371 of International Application No. PCT/KR2015/001157, filed on Feb. 4, 2015, which claims the benefit of U.S. Provisional Application No. 61/935,722, filed on Feb, 4, 2014, the contents of which are all hereby incorporated by reference herein in their entirety.

BACKGROUND OF THE INVENTION

Field of the Invention

The present invention relates to wireless communications, and more particularly, to a method and apparatus for delaying autonomous resource fallback for device-to-device (D2D) operation in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

As a part of ProSe, device-to-device (D2D) operation between UEs has been discussed. Resources used for D2D operation may be newly defined. While a first UE communicates with a second UE by using D2D operation, resources used for D2D operation may be changed autonomously when the first UE moves out of coverage from in coverage. However, according to situation, there is need to delay autonomous change of resources even though the first UE moves out of coverage.

SUMMARY OF THE INVENTION

The present invention provides a method and apparatus for delaying autonomous resource fallback for device-to-device (D2D) operation in a wireless communication system. The present invention provides a method for performing D2D transmission by using either one of D2D resources for in-coverage or D2D resources for out-of-coverage upon detecting that the UE is out of coverage.

In an aspect, a method for performing, by a user equipment (UE), device-to-device (D2D) transmission in a wireless communication system is provided. The method includes determining, by the UE, that the UE is out of coverage (OOC), continuing, by the UE, to perform D2D transmission by using D2D resources for in-coverage under a specific condition, and performing, by the UE, D2D transmission by using either one of the D2D resources for in-coverage or D2D resources for OOC based on the specific condition.

In another aspect, a user equipment (UE) configured to perform device-to-device (D2D) transmission in a wireless communication system is provided. The UE includes a radio frequency (RF) unit configured to transmit or receive a radio signal, and a processor coupled to the RF unit, and configured to determine that the UE is out of coverage (OOC), continue to use perform D2D transmission by using D2D resources for in-coverage under a specific condition, and perform D2D transmission by using either one of the D2D resources for in-coverage or D2D resources for OOC based on the specific condition.

Efficient D2D operation can be performed.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
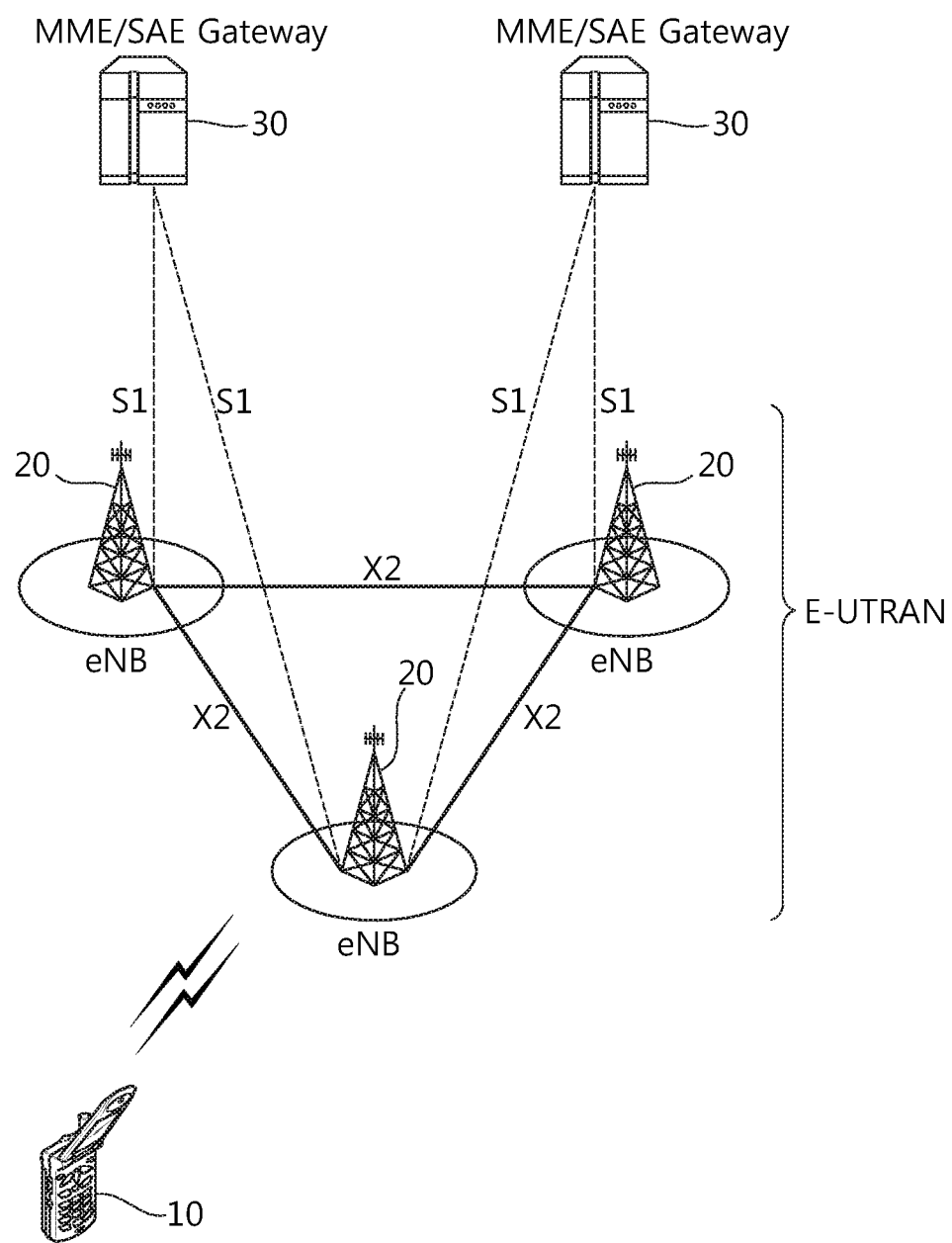
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
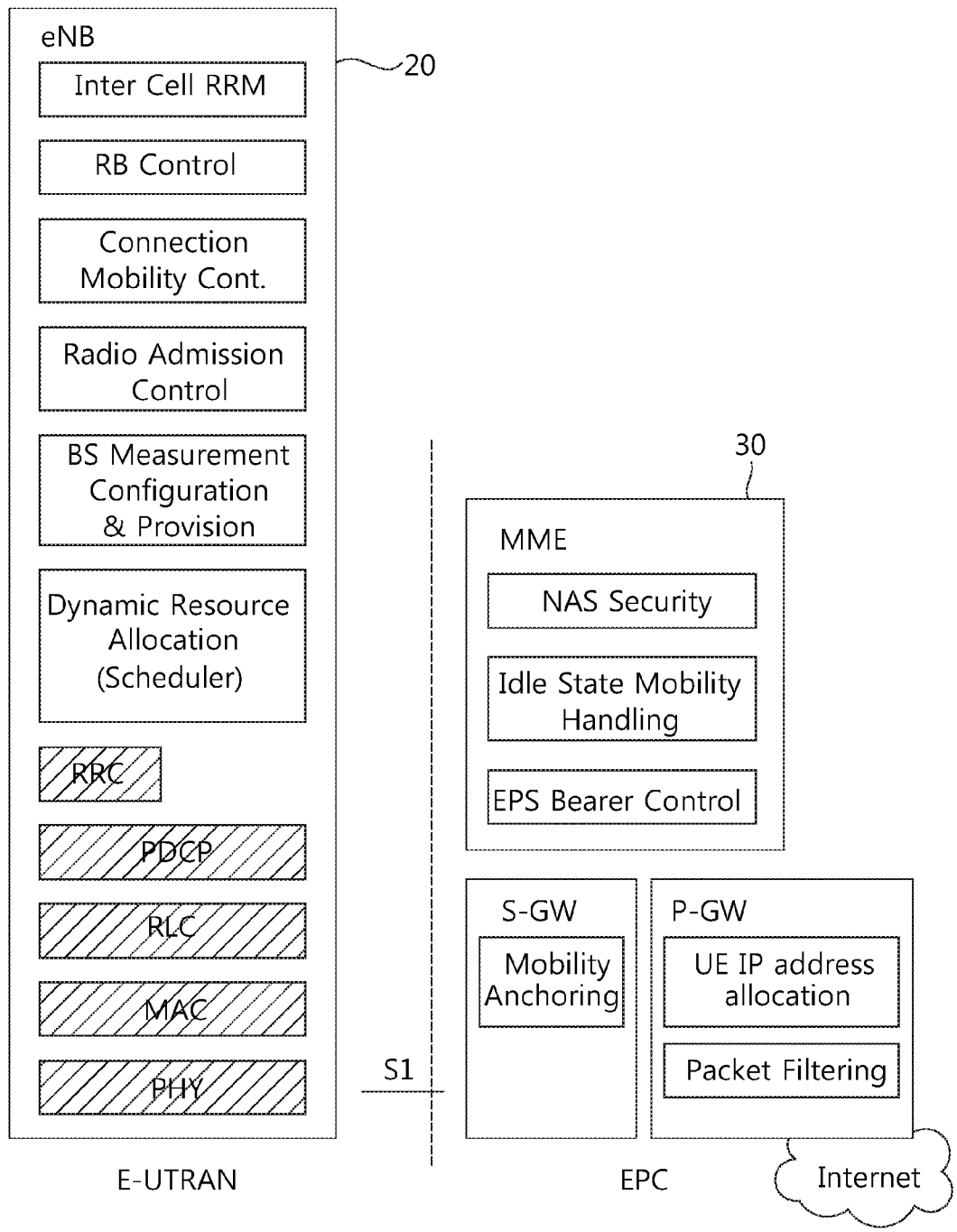
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
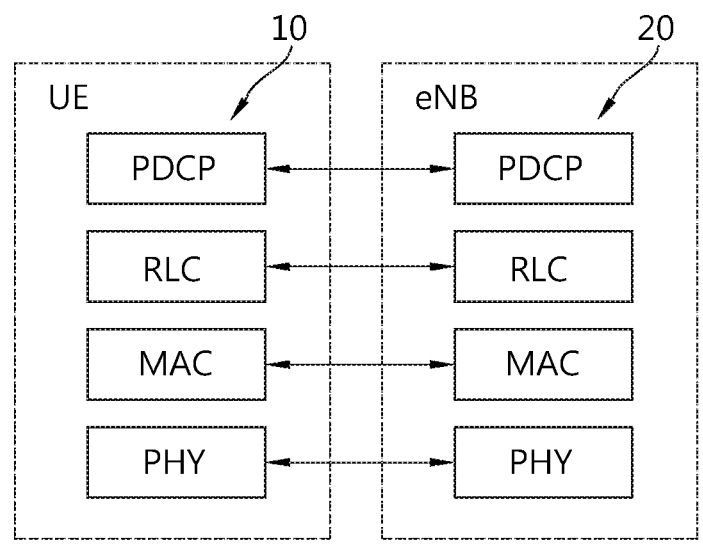
FIG. 3 shows a block diagram of a user plane protocol stack of an LTE system.
Figure 4:
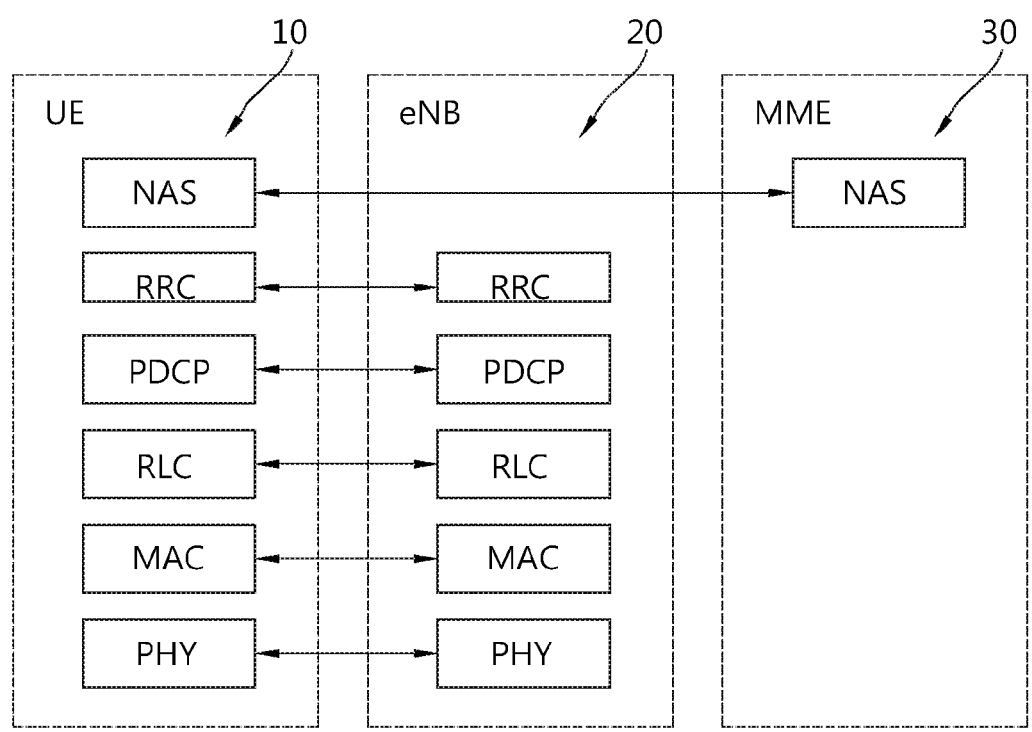
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
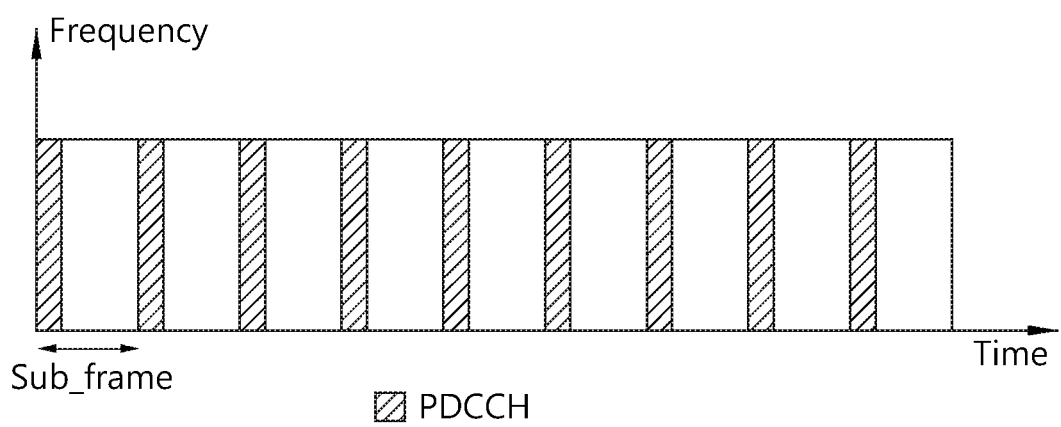
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle.

The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Proximity-based services (ProSe) are described. It may be referred to 3GPP TR 23.703 V1.0.0 (2013-December) and/or 3GPP TR 36.843 V1.0.0 (2013-November). ProSe may be a concept including a device-to-device (D2D) communication. Hereinafter, "ProSe" may be used by being mixed with "D2D".

ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity. ProSe UE identity (ID) is a unique identity allocated by evolved packet system (EPS) which identifies the ProSe enabled UE. ProSe application ID is an identity identifying application related information for the ProSe enabled UE. They can exist more than one ProSe application IDs per UE.

Two different modes for ProSe direct communication are supported:
1. Network independent direct communication: This mode of operation for ProSe direct communication does not require any network assistance to authorize the connection and communication is performed by using only functionality and information local to the UE(s). This mode is applicable:
    only to pre-authorized ProSe-enabled public safety UEs, regardless of whether the UEs are served by E-UTRAN or not,
    to both ProSe direct communication one-to-one and to ProSe direct communication one-to-many.
2. Network authorized direct communication: This mode of operation for ProSe direct communication always requires network assistance by the EPC to authorize the connection. This mode of operation applies:
    to ProSe direct communication one-to-one,
    when both UEs are served by E-UTRAN, and
    for public safety UEs it may apply when only one UE is served by E-UTRAN.

It has been identified that the following models for direct discovery may exist.
1. Mode A ("I am here"): This model defines two roles for the UEs that are participating in direct discovery.
    Announcing UE: The UE announces certain information that may be used from UEs in proximity that have permission to discover.
    Monitoring UE: The UE that receives certain information that is interested in from other UEs in proximity.

In this model, the announcing UE broadcasts the discovery messages at pre-defined discovery intervals and the UEs that are interested in these messages read them and process them. It is equivalent to "I am here" since the announcing UE would broadcast information about itself, e.g. its ProSe application IDs or ProSe UE IDs in the discovery message.
2. Model B ("who is there"/"are you there"): This model defines two roles for the UEs that are participating in direct discovery.
    Discoverer UE: The UE transmits a request containing certain information about what is interested to discover.
    Discoveree UE: The UE that receives the request message can respond with some information related to the discoverer's request.

It is equivalent to "who is there/are you there" since the discoverer UE sends information about other UEs that would like to receive responses from, e.g. the information can be about a ProSe application ID corresponding to a group and the members of the group can respond.

Figure 6:
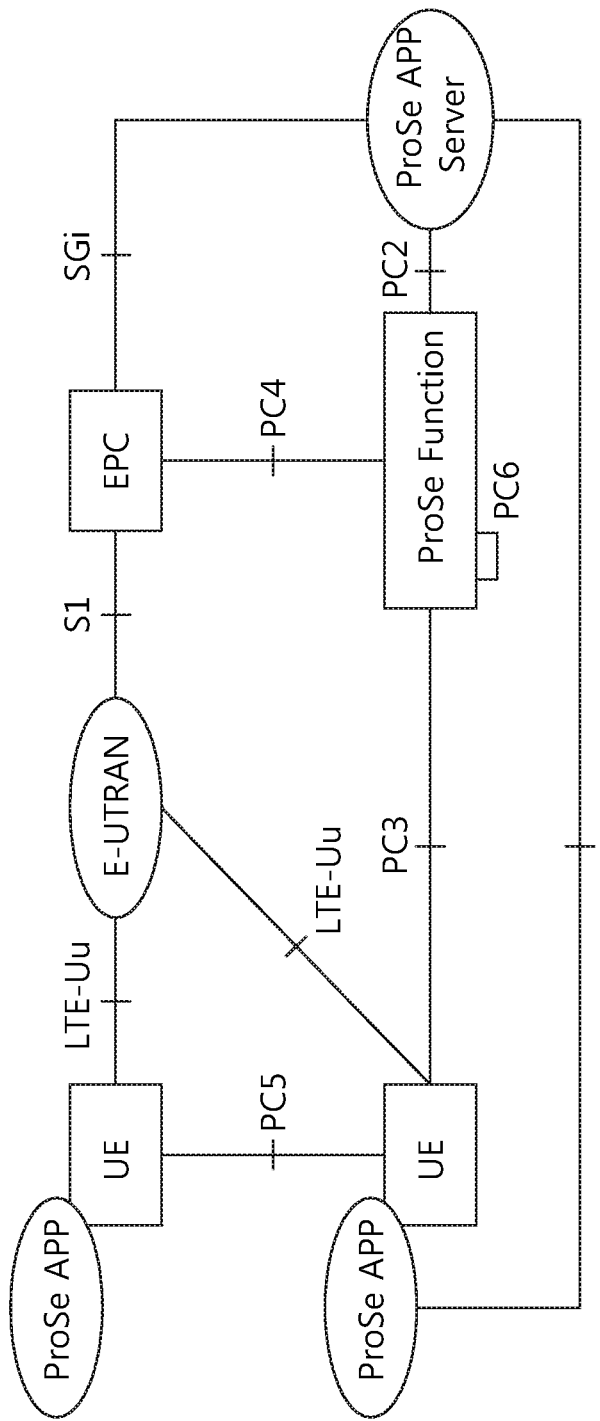
FIG. 6 shows reference architecture for ProSe.

FIG. 6 shows reference architecture for ProSe. Referring to FIG. 6, the reference architecture for ProSe includes E-UTRAN, EPC, a plurality of UEs having ProSe applications, ProSe application server, and ProSe function. The EPC represents the E-UTRAN core network architecture. The EPC includes entities such as MME, S-GW, P-GW, policy and charging rules function (PCRF), home subscriber server (HSS), etc. The ProSe application servers are users of the ProSe capability for building the application functionality. In the public safety cases, they can be specific agencies (PSAP), or in the commercial cases social media. These applications rare defined outside the 3GPP architecture but there may be reference points towards 3GPP entities. The application server can communicate towards an application in the UE. Applications in the UE use the ProSe capability for building the application functionality. Example may be for communication between members of public safety groups or for social media application that requests to find buddies in proximity.

The ProSe function in the network (as part of EPS) defined by 3GPP has a reference point towards the ProSe application server, towards the EPC and the UE. The functionality may include at least one of followings, but not be restricted thereto.
    Interworking via a reference point towards the 3rd party applications
    Authorization and configuration of the UE for discovery and direct communication
    Enable the functionality of the EPC level ProSe discovery
    ProSe related new subscriber data and handling of data storage, and also handling of ProSe identities
    Security related functionality
    Provide control towards the EPC for policy related functionality
    Provide functionality for charging (via or outside of EPC, e.g., offline charging)
    Reference points/interfaces in the reference architecture for ProSe are described.
    PC1: It is the reference point between the ProSe application in the UE and in the
    ProSe application server. It is used to define application level signaling requirements.
    PC2: It is the reference point between the ProSe application server and the ProSe function. It is used to define the interaction between ProSe application server and ProSe functionality provided by the 3GPP EPS via ProSe function. One example may be for application data updates for a ProSe database in the ProSe function.

Another example may be data for use by ProSe application server in interworking between 3GPP functionality and application data, e.g., name translation.

PC3: It is the reference point between the UE and ProSe function. It is used to define the interaction between UE and ProSe function. An example may be to use for configuration for ProSe discovery and communication.

PC4: It is the reference point between the EPC and ProSe function. It is used to define the interaction between EPC and ProSe function. Possible use cases may be when setting up a one-to-one communication path between UEs or when validating ProSe services (authorization) for session management or mobility management in real time.

PC5: It is the reference point between UE to UE used for control and user plane for discovery and communication, for relay and one-to-one communication (between UEs directly and between UEs over LTE-Uu).

PC6: This reference point may be used for functions such as ProSe discovery between users subscribed to different PLMNs.

SGi: In addition to the relevant functions via SGi, it may be used for application data and application level control information exchange.

Figure 7:
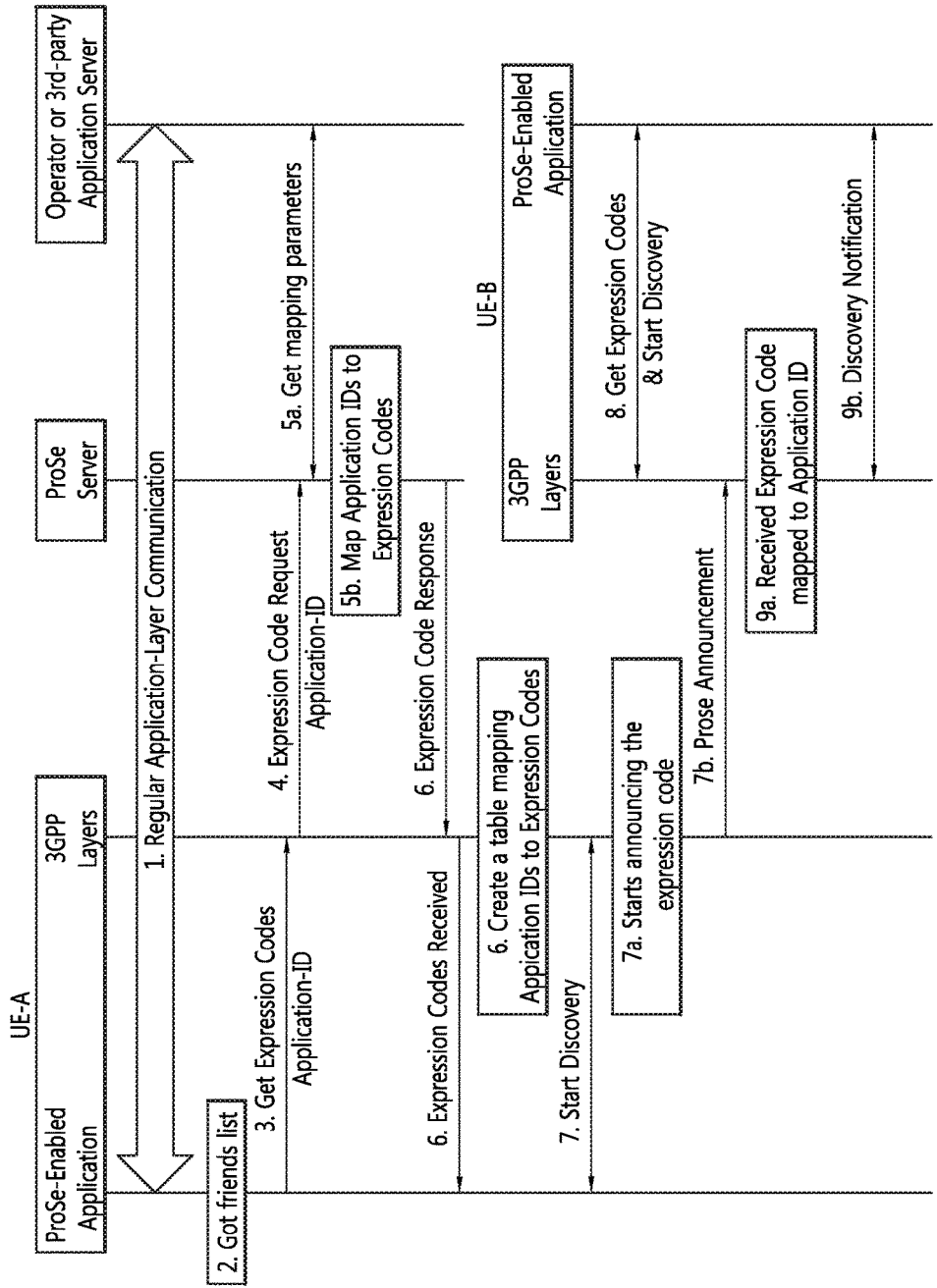
FIG. 7 shows an example of one-step ProSe direct discovery procedure.

FIG. 7 shows an example of one-step ProSe direct discovery procedure. FIG. 7 corresponds to a solution for direct discovery. This solution is based on mapping application identities to ProSe private expression codes in the network. FIG. 7 shows that two UEs are running the same ProSe-enabled application and it is assumed that the users of those UEs have a "friend" relationship on the considered application. The "3GPP Layers" shown in FIG. 7 correspond to the functionality specified by 3GPP that enables mobile applications in the UE to use ProSe discovery services.

UE-A and UE-B run a ProSe-enabled application, which discovers and connects with an associated application server in the network. As an example, this application could be a social networking application. The application server could be operated by the 3GPP network operator or by a third-party service provider. When operated by a third-party provider, a service agreement is required between the third-party provider and the 3GPP operator in order to enable communication between the ProSe Server in the 3GPP network and the application server.

1. Regular application-layer communication takes place between the mobile application in UE-A and the application server in the network.
2. The ProSe-enabled application in UE-A retrieves a list of application-layer identifiers, called "friends". Typically, such identifiers have the form of a network access identifier.
3. The ProSe-enabled application wants to be notified when one of UE-A's friends is in the vicinity of UE-A. For this purpose, it requests from the 3GPP layers to retrieve private expressions codes (i) for the user of UE-A (with an application-layer identity) and (ii) for each one of his friends.
4. The 3GPP layers delegate the request to a ProSe server in the 3GPP network. This server can be located either in home PLMN (HPLMN) or in a visited PLMN (VPLMN). Any ProSe server that supports the considered application can be used. The communication between the UE and ProSe server can take place either over the IP layer or below the IP layer. If the application or the UE is not authorized to use ProSe discovery, then the ProSe server rejects the request.
5. The ProSe server maps all provided application-layer identities to private expression codes. For example, the application-layer identity is mapped to the private expression code. This mapping is based on parameters retrieved from the application server in the network (e.g., mapping algorithm, keys, etc.) thus the derived private expression code can be globally unique. In other words, any ProSe server requested to derive the private expression of the application-layer identity for a specific application, it will derive the same private expression code. The mapping parameters retrieved from the application server describe how the mapping should be done. In this step, the ProSe server and/or the application server in the network authorize also the request to retrieve expression codes for a certain application and from a certain user. It is ensured, for example, that a user can retrieves expression codes only for his friends.
6. The derived expression codes for all requested identities are sent to the 3GPP layers, where they are stored for further use. In addition, the 3GPP layers notify the ProSe-enabled application that expression codes for the requested identities and application have been successfully retrieved. However, the retrieved expression codes are not sent to the ProSe-enabled application.
7. The ProSe-enabled application requests from the 3GPP layers to start discovery, i.e., attempt to discover when one of the provided "friends" is in the vicinity of UE-A and, thus, direct communication is feasible. As a response, UE-A announces the expression code of the application-layer identity for the considered application. The mapping of this expression code to the corresponding application-layer identify can only be performed by the friends of UE-A, who have also received the expression codes for the considered application.
8. UE-B also runs the same ProSe-enabled application and has executed steps 3-6 to retrieve the expression codes for friends. In addition, the 3GPP layers in UE-B carry out ProSe discovery after being requested by the ProSe-enabled application.
9. When UE-B receives the ProSe announcement from UE-A, it determines that the announced expression code is known and maps to a certain application and to the application-layer identity. The UE-B can determine the application and the application identity that corresponds to the received expression code because it has also received the expression code for the application-layer identity (UE-A is included in the friend list of UE-B).

The steps 1-6 in the above procedure can only be executed when the UE is inside the network coverage. However, these steps are not required frequently. They are only required when the UE wants to update or modify the friends that should be discovered with ProSe direct discovery. After receiving the requested expression codes from the network, the ProSe discovery (steps 7 and 9) can be conducted either inside or outside the network coverage.

It is noted that an expression code maps to a certain application and to a certain application identity. Thus when a user runs the same ProSe-enabled application on multiple UEs, each UE announces the same expression code.

Figure 8:
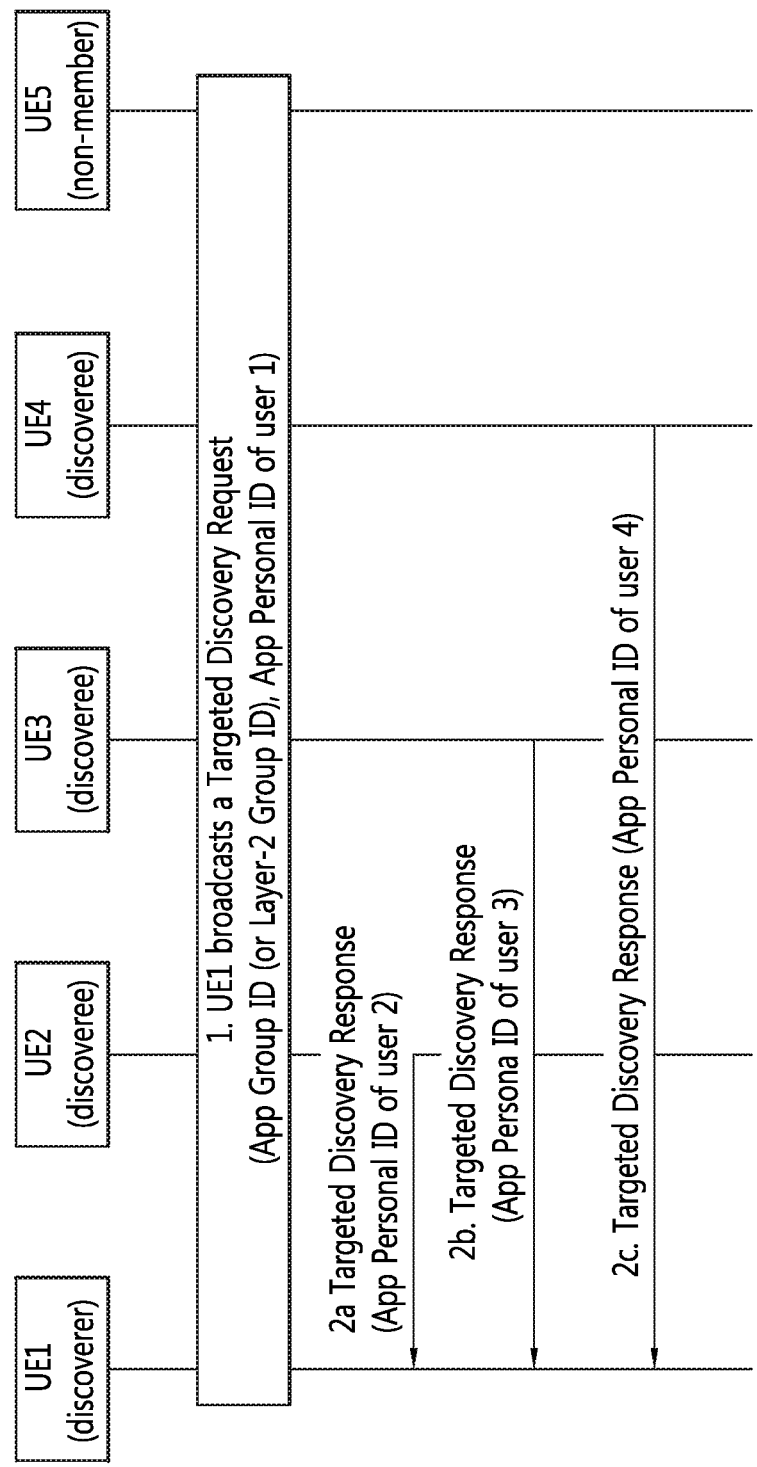
FIG. 8 shows an example of two-steps ProSe direct discovery procedure.

FIG. 8 shows an example of two-steps ProSe direct discovery procedure. FIG. 8 corresponds to a targeted ProSe discovery. The present solution is a "who is there?" type of solution where a user (the "discoverer") searches to discover a specific target population (the "discoverees").

1. The user of UE1 (the discoverer) wishes to discover whether there are any members of a specific group communication service enabler (GCSE) group in proximity. UE1 broadcasts a targeted discovery request message containing the unique App group ID (or the Layer-2 group ID) of the targeted GCSE group. The targeted discovery request message may also include the discoverer's unique identifier (App personal ID of user 1). The targeted discovery request message is received by UE2, UE3, UE4 and UE5. Apart from the user of UE5, all other users are members of the requested GCSE group and their UEs are configured accordingly.

2a-2c. Each one of UE2, UE3 and UE4 responds directly to UE1 with a targeted discovery response message which may contain the unique App personal ID of its user. In contrast, UE5 sends no response message.

In three step procedure, UE1 may respond to the targeted discovery response message by sending a discovery confirm message.

For general design assumption for D2D operation, it is assumed that D2D operates in uplink spectrum (in the case of frequency division duplex (FDD)) or uplink sub-frames of the cell giving coverage (in case of time division duplex (TDD) except when out of coverage). Use of downlink sub-frames in the case of TDD can be studied further. It is assumed that D2D transmission/reception does not use full duplex on a given carrier. From individual UE perspective, on a given carrier D2D signal reception and cellular uplink transmission do not use full duplex. For multiplexing of a D2D signal and cellular signal from an individual UE perspective on a given carrier, frequency division multiplexing (FDM) shall not be used, but time division multiplexing (TDM) can be used. This includes a mechanism for handling/avoiding collisions.

D2D discovery is described. At least the following two types of discovery procedure are defined. However, it is clear that these definitions are intended only to aid clarity for description and not to limit the scope of the present invention.

Type 1: a discovery procedure where resources for discovery signal transmission are allocated on a non UE specific basis.

Type 2: a discovery procedure where resources for discovery signal transmission are allocated on a per UE specific basis. Resources may be allocated for each specific transmission instance of discovery signals, or may be semi-persistently allocated for discovery signal transmission.

Note that further details of how the resources are allocated and by which entity, and of how resources for transmission are selected within the allocated resources, are not restricted by these definitions.

FIG. 9 to FIG. 12 shows scenarios for D2D ProSe. Referring to FIG. 9 to FIG. 12, UE1 and UE2 are located in coverage/out of coverage of a cell. When UE1 has a role of transmission, UE1 sends discovery message and UE2 receives it. UE1 and UE2 can change their transmission and reception role. The transmission from UE1 can be received by one or more UEs like UE2. Table 1 shows more detailed D2D scenarios described in FIG. 9 to FIG. 12.

TABLE 1

Figure 9:
FIG. 9 to FIG. 12 shows scenarios for D2D ProSe.
Figure 10:
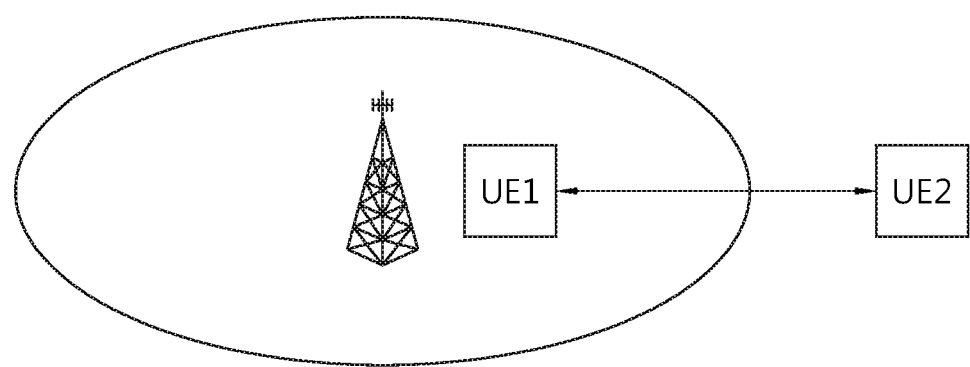
Figure 11:
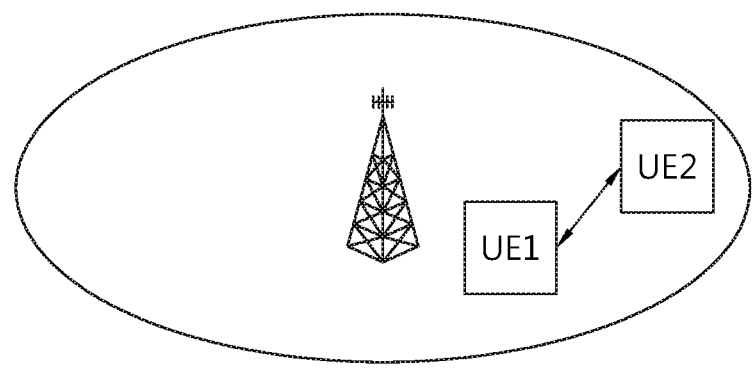
Figure 12:
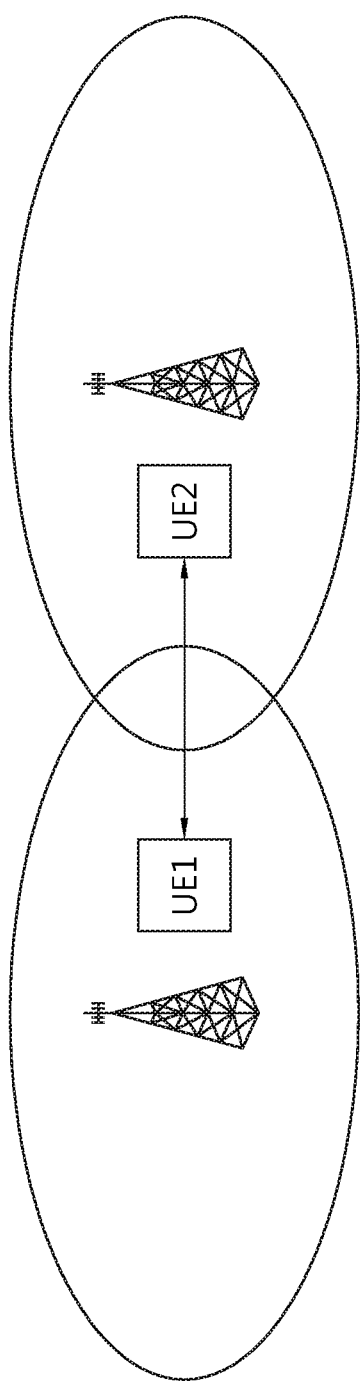

| Scenarios | UE1 | UE2 |
|---|---|---|
| FIG. 9: Out of Coverage | Out of Coverage | Out of Coverage |
| FIG. 10: Partial Coverage | In Coverage | Out of Coverage |
| FIG. 11: In Coverage-Single-Cell | In Coverage | In Coverage |
| FIG. 12: In Coverage-Multi-Cell | In Coverage | In Coverage |

Referring to Table 1, the scenario shown in FIG. 9 corresponds to a case that both UE1 and UE2 are out of coverage. The scenario shown in FIG. 10 corresponds to a case that UE1 is in coverage, but UE2 is out of coverage. The scenario shown in both FIG. 11 and FIG. 12 corresponds to a case that both UE1 and UE2 are in coverage. But, the scenario shown in FIG. 11 corresponds to a case that UE1 and UE2 are both in coverage of a single cell, while the scenario shown in FIG. 12 corresponds to a case that UE1 and UE2 are in coverage of multi-cells, respectively, which are neighboring each other.

D2D communication is described. D2D discovery is not a required step for groupcast and broadcast communication. For groupcast and broadcast, it is not assumed that all receiving UEs in the group are in proximity of each other. When UE1 has a role of transmission, UE1 sends data and UE2 receives it. UE1 and UE2 can change their transmission and reception role. The transmission from UE1 can be received by one or more UEs like UE2.

D2D relay functionality is described. There are two types of D2D relay functionality, i.e. UE-NW relay and UE-UE relay. In UE-NW relay, one network node (e.g. UE) can serve UE-NW relaying functionality for other UE that is out of network coverage. In UE-UE relay, one network node (e.g. UE) can serve UE-UE relaying functionality for other UEs that are out of coverage each other/one another.

Figure 13:
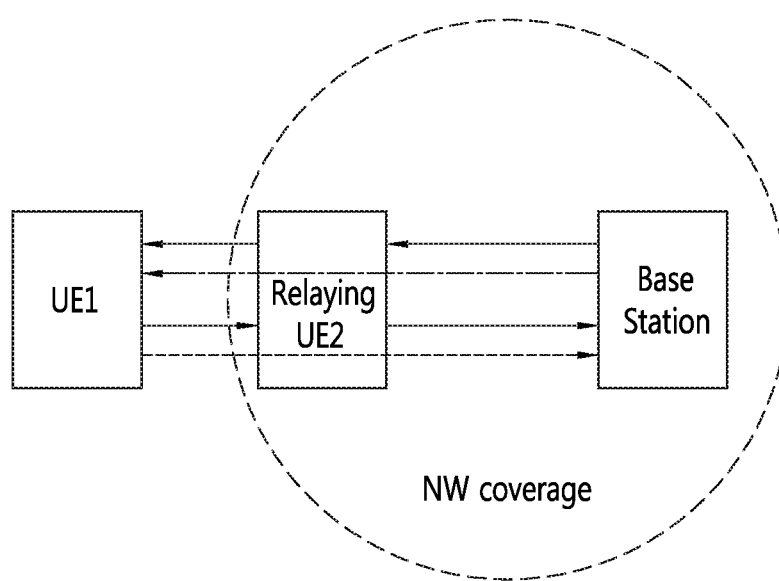
FIG. 13 shows an example of UE-NW relay functionality.

FIG. 13 shows an example of UE-NW relay functionality. Referring to FIG. 13, UE1 cannot communicate with base station without UE2 that can serve UE-NW relay functionality for UE1. Accordingly, UE1 can communicate with base station with UE2 that serves relay functionality for UE1.

Figure 14:
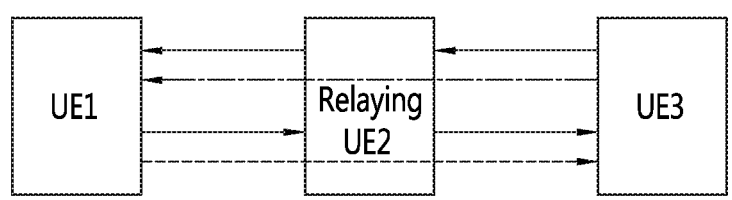
FIG. 14 shows an example of UE-UE relay functionality.

FIG. 14 shows an example of UE-UE relay functionality. UE1 cannot communicate with UE3 without UE2 that can serve UE-UE relay functionality for UE1 and UE3. Accordingly, UE1 can communicate with UE3 with UE2 that serves UE-UE relay functionality for UE1 and UE3.

Hop count of a relay node may be counted. The hop count of the relay node may be defined as the number of communication links between the network node serving relay functionality and relay target for other network node (e.g. UEs). For UE-NW relay, the hop count is the number of communication links between the relay node and network. For example, in FIG. 13, the hop count of relaying node of UE2 for UE-NW relaying functionality is 1 (UE2-NW). The network node serving relay functionality may signal its hop count for UE-NW relay.

Figure 15:
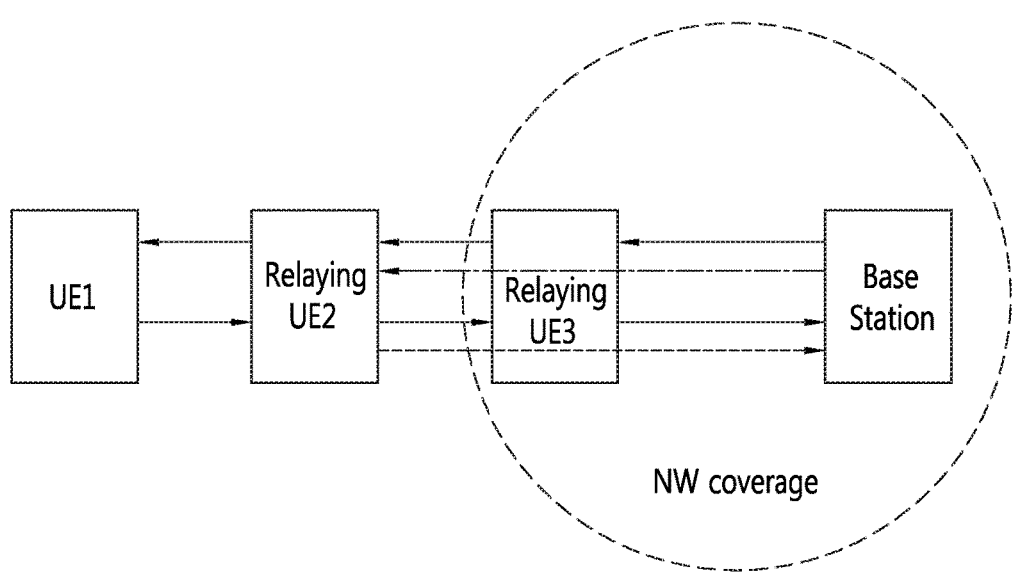
FIG. 15 shows an example of a hop count of a relay node.

FIG. 15 shows an example of a hop count of a relay node. Referring to FIG. 15, the hop count of relay node of UE2 for UE-NW relay functionality is 2, i.e. one hop between UE2 and UE3 and another one hop between UE3 and the base station.

Further, when the UE decides to generate and transmit a synchronization signal, the UE may take other synchronization signal as a reference synchronization signal and thus aligns the timing of the generated synchronization signal to the reference synchronization signal. In this case, hop count of a synchronization signal may be counted. The hop count of the synchronization signal may be defined as the number of connections between reference synchronization source and the concerned synchronization source. For example, UE1 may take a synchronization signal transmitted by network node A as a reference synchronization signal, and the UE1 may generate and transmit a synchronization signal whose timing is the same as the reference signal. In this case, hop count of the synchronization signal transmitted by UE1 is 1.

Figure 16:
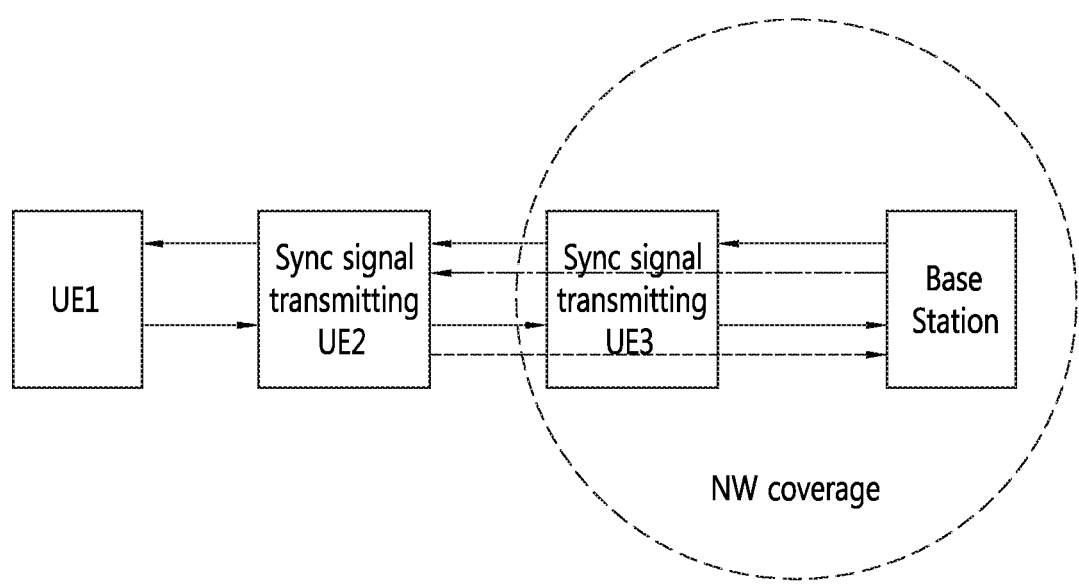
FIG. 16 shows an example of a hop count of a synchronization signal.

FIG. 16 shows an example of a hop count of a synchronization signal. Referring to FIG. 16, UE3 takes a synchronization signal transmitted by the base station as a reference synchronization signal, and UE2 takes a synchronization signal transmitted by the UE3 as a reference synchronization signal. Then when UE1 detects a synchronization signal transmitted by UE2, UE1 may identify that the hop count of the detected synchronization signal is 2.

Resources used for D2D operation may be newly defined. Further, resources used for D2D operation when a UE is in coverage and resources used for D2D operation when a UE is out of coverage may be defined separately. It is because that when the UE is in coverage, the network can control resources used for D2D operation, but on the other hand, when the UE is out of coverage, the network cannot control resources used for D2D operation. In this case, when the UE moves out of coverage and changes resources used for D2D operation autonomously, other UE may fail to receive D2D transmission.

In order to solve the problem described above, a method for delaying autonomous change of resources for D2D operation according to an embodiment of the present invention is described below. According to an embodiment of the present invention, even though the UE moves out of coverage (may be referred OOC for the sake of convenience), the UE can use the D2D resources used in coverage under a specific condition. In other words, according to an embodiment of the present invention, even though the UE is OOC, the UE does not use D2D resources for OOC, and may define a transition guard time and/or hysteresis for change of resources for D2D operation. Accordingly, even if one UE is moving in coverage or out of coverage, D2D communication can be continued.

Figure 17:
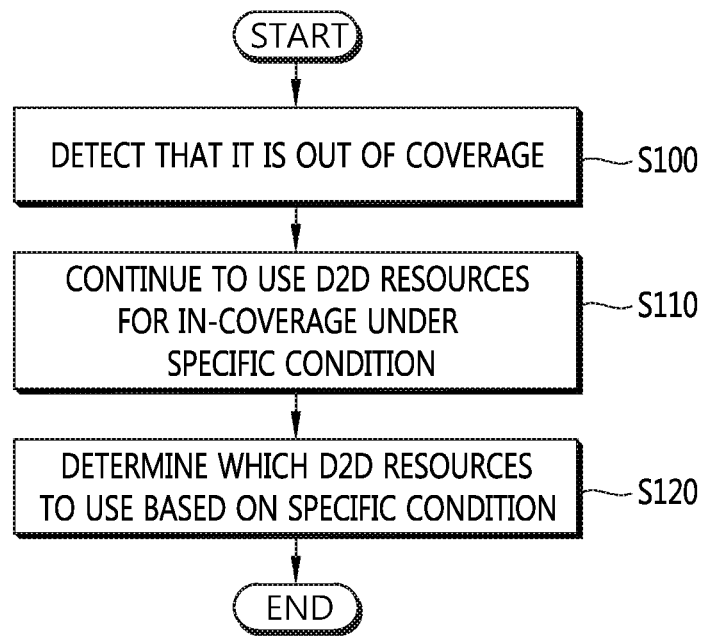
FIG. 17 shows an example of a method for performing D2D transmission to an embodiment of the present invention.

FIG. 17 shows an example of a method for performing D2D transmission to an embodiment of the present invention. UE1 may camp on a cell 1 or may be connected to the cell 1, or may be interested to perform D2D operation on frequency of the cell 1. UE1 may be in RRC_IDLE or RRC_CONNECTED. UE1 may be synchronized with the cell 1 (i.e. the UE may follow synchronization based on a synchronization signal transmitted by the cell 1). UE1 may obtain system information transmitted by the cell 1. UE1 may communicate with other UE(s) via D2D communication. UE1 may receive data from other UE via D2D communication, and/or UE1 may transmit data to other UE via D2D communication. Other UE may be in coverage. Or, other UE may be out of coverage.

Regarding D2D resources, UE1 may be configured with D2D resources for in-coverage. The D2D resources for in-coverage define radio resources which UE1 is allowed to use for D2D operation while camping in the cell 1. More specifically, if the UE performs D2D operation in a serving cell, the D2D resources for in-coverage are provided by the serving cell. If the UE performs D2D operation in a non-serving cell, the D2D resources for in-coverage are provided by a cell of frequency in which the UE performs D2D operation. The D2D resources for in-coverage may be a first resource pool. UE1 may be further configured with D2D resources for OOC. The D2D resources for OOC define radio resources which UE1 is allowed to use for D2D operation in OOC. The D2D resources for OOC may be pre-configured. The D2D resources for OOC may be a second resource pool. UE1 may be further configured with a third resource pool, which defines radio resources which UE1 is allowed to use for D2D operation while camping in cell 2.

Referring to FIG. 17, in step S100, UE1 determines that it is OOC. OOC may be determined by applying at least one of following criteria. The criteria for determining OOC may be preconfigured by UE1 or the network.

1. Normal OOC Declaration

UE1 may determine that it is OOC based on synchronization signal detection. For example, if UE1 cannot detect a synchronization signal transmitted by its serving cell (or, UE with relay functionality) or if UE1 detects that error rate of synchronization signal detection is beyond a certain threshold, UE1 determines that it is OOC.

Or, UE1 may determine that it is OOC based on signal strength measurements of reference signals of its serving cell (or, UE serving relay functionality) with relay functionality. For example, if the UE1 measures reference signal received power (RSRP) of its serving cell (or, UE serving relay functionality) and the measured result is lower than a certain threshold (e.g. −110 dBm), UE1 determines that it is OOC.

Or, UE1 may determine that it is OOC based on radio link monitoring, which may be defined in 3GPP TS 36.331 specification. For example, UE1 may determine that it is OOC upon detecting radio link failure (RLF) triggered by physical layer problems, i.e. upon receiving N310 consecutive out-of-sync indications corresponding to the cell (or, UE serving relay functionality) from lower layers and then expiry of T310 without receiving N311 consecutive in-sync indications from lower layers, triggering the handover procedure and initiating the connection re-establishment procedure while T310 is running. Or, UE1 may determine that it is OOC upon detecting physical layer problems, i.e. upon receiving N310 consecutive out-of-sync indications corresponding to the cell (or, UE serving relay functionality) from lower layers.

2. Early OOC Declaration

Declaration of OOC may be performed in prior to experiencing actual OOC in order to better communicate with the network and/or other UEs while still in coverage. This may be referred to as early OOC declaration. For example, assuming that the UE1 has been serving relay functionality to other UEs (e.g. data relaying from/to the network to/from the UEs or relaying system information block (SIB) from the network to UEs), notification of OOC of UE1 to other UE may further require the UE1 and other UEs to perform change of relay-operation node or change of synchronization signal generating node, which may be better performed while UE1 is still in coverage. That is, UE1 may need to declare OOC a little bit earlier.

UE1 may declare early OOC and determine to notify OOC when error rate of synchronization signal detection is beyond a certain threshold that is lower than the value which is used for detection of normal OOC.

Or, UE1 may declare early OOC upon detecting physical layer problems, i.e. upon receiving N310 consecutive out-of-sync indications corresponding to the cell (or, UE serving relay functionality) from lower layers, UE1 determines that it is out of coverage. A separate N310 for detection of early OOC may be configured.

Or, UE1 may declare early OOC upon detecting RLF triggered by physical layer problems, i.e. upon receiving N310 consecutive out-of-sync indications corresponding to the cell (or, UE serving relay functionality) from lower layers and then expiry of T310 without receiving N311 consecutive in-sync indications from lower layers, triggering the handover procedure and initiating the connection re-establishment procedure while T310 is running. Separate N310 and N311 for detection of early OOC may be configured.

Or, UE1 may declare early OOC and determine to notify OOC when RSRP of serving cell (or, UE serving relay functionality) is lower than a certain threshold that is higher than the threshold which is used for detection of normal OOC.

3. Late OOC Declaration

Declaration of OOC may be performed some time after UE1 experience normal OOC. For example, if UE1 can maintain sufficient synchronization accuracy based on its internal clock and pre-synchronized time, even without detecting some or any synchronization signal transmitted by the cell (or, UE serving relay functionality).

UE1 may declare late OOC and determine to notify OOC when error rate of synchronization signal detection is beyond a certain threshold that is higher than the value which is used for detection of normal OOC.

Or, UE1 may declare late OOC upon detecting physical layer problems, i.e. upon receiving N310 consecutive out-of-sync indications corresponding to the cell (or, UE serving relay functionality) from lower layers, UE1 determines that it is out of coverage. A separate N310 for detection of late OOC may be configured.

Or, UE1 may declare late OOC upon detecting RLF triggered by physical layer problems, i.e. upon receiving N310 consecutive out-of-sync indications corresponding to the cell (or, UE serving relay functionality) from lower layers and then expiry of T310 without receiving N311 consecutive in-sync indications from lower layers, triggering the handover procedure and initiating the connection re-establishment procedure while T310 is running. Separate N310 and N311 for detection of late OOC may be configured.

Or, UE1 may declare late OOC and determine to notify OOC when RSRP of serving cell is lower than a certain threshold that is lower than the threshold which is used for detection of normal OOC.

Back to FIG. 17, in step S110, UE1 continues to use the D2D resources for in-coverage to communicate with other UE(s) under a specific condition, and UE1 starts to evaluate the specific condition. The specific condition may be a timer. That is, while a timer is running (i.e. the timer does not expire) or when the timer restarts, UE1 continues to use the D2D resources for in-coverage. In this case, the evaluation of the specific condition may be related to evaluating whether the timer is running or expires. Alternatively, the specific condition may be related to a specific RSRP threshold, which is different value from the RSRP threshold used for determining OOC. That is, if measurement result is higher than a specific RSRP threshold, UE1 continues to use the D2D resources for in-coverage . In this case, the evaluating the specific condition may be related to evaluating whether the measurement result is lower than the specific RSRP threshold.

In step S120, UE1 determines which D2D resources to use based on the specific condition. If UE1 detects that it is again in coverage of the same cell (cell 1) before the specific condition is met, UE1 continues to use the D2D resources for in-coverage to communicate with other UE(s), and UE stops evaluating the specific condition (until UE1 detects again that it is OOC). If the specific condition is the timer, the timer may be reset if running. If UE1 detects that it is in coverage of the other cell (cell 2) before the specific condition is met, UE1 uses the third resource pool which is used in the cell 2, while camping on the cell 2 for D2D operation to communicate with other UE(s), and UE does not evaluate the specific condition (until UE1 detects again that it is OOC). If the specific condition is the timer, the timer may be reset if running.

If the specific condition is met while UE1 is OOC, UE1 changes D2D resources from the D2D resources for in-coverage to the D2D resources for OOC. If the specific condition is timer, when the timer expires, UE1 changes D2D resources from the D2D resources for in-coverage to the D2D resources for OOC. Further, in addition to change of D2D resources, resource allocation method for D2D operation may be also changed. For example, while resources for in-coverage may be configured by the network (i.e. network scheduling mode), resources for OOC may be selected by UE1 (i.e. UE-selected mode).

Figure 18:
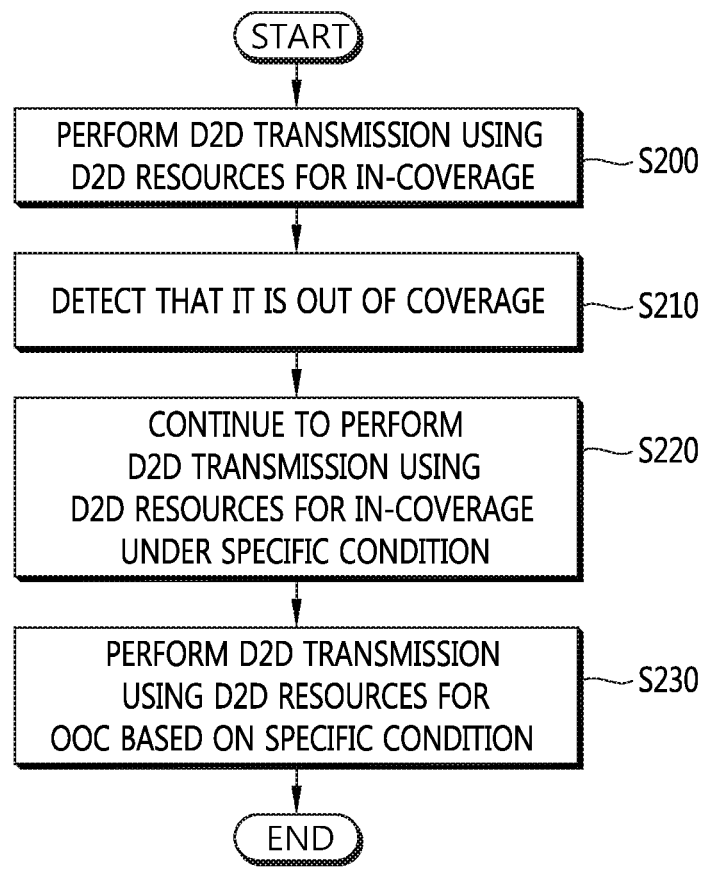
FIG. 18 shows another example of a method for performing D2D transmission to an embodiment of the present invention.

FIG. 18 shows another example of a method for performing D2D transmission to an embodiment of the present invention. In step S200, the UE performs D2D transmission using the D2D resources for in-coverage. In step S210, the UE determines that it is OOC. OOC may indicate one of normal OOC, early OOC, or late OOC, which may be determined as described above. In step S220, even though the UE determines that it is OOC, the UE continues to perform D2D transmission using the D2D resources for in-coverage under a specific condition. The specific condition may be related to a timer or a specific RSRP threshold, as described above. In step S230, the UE performs D2D transmission using the D2D resources for OOC based on the specific condition. If the timer expires or the measurement result is lower than the specific RSRP threshold, the UE performs D2D transmission using the D2D resources for OOC based on the specific condition.

In the description above, for the sake of convenience, a case that UE1 moves from in coverage to OOC is only described. However, the present invention is not limited thereto, but may be applied to other cases. The present invention may be applied to a case that UE1 moves from OOC to in coverage. In this case, upon detecting that it is in coverage, while UE1 continues to use the D2D resources for OOC in a specific condition, UE1 determines which D2D resources to use under the specific condition. If UE1 detects that it is again OOC before the specific condition is met, UE1 continues to use the D2D resources for OOC. If the specific condition is met while UE1 is in coverage, UE1 changes D2D resources from the D2D resources for OOC to the D2D resources for in-coverage. The specific condition may be a timer or a specific RSRP threshold. The specific condition for this case (i.e. OOC to in-coverage) may be different from the specific condition for above case (i.e. in-coverage to OOC). Or, the specific condition for this case may be identical with the specific for above case. Alternatively, the present invention may be applied to a case that UE1 moves from in coverage to OOC, but may be not applied to a case that UE1 moves from OOC to in-coverage.

Figure 19:
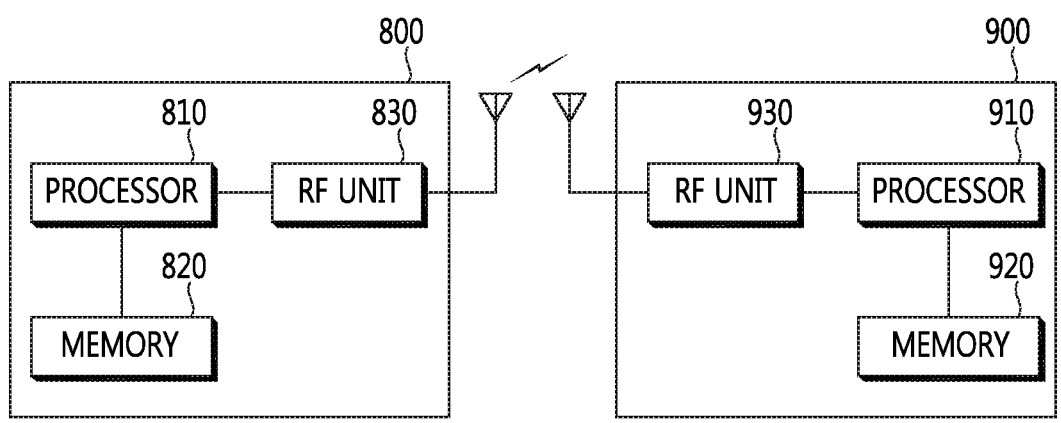
FIG. 19 shows a wireless communication system to implement an embodiment of the present invention.

FIG. 19 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing, by a user equipment (UE), device-to-device (D2D) transmission in a wireless communication system, the method comprising:
   camping on a serving cell by the UE;
   after camping on the serving cell, configuring, by the UE, a first D2D resource and a second D2D resource,
   wherein the first D2D resource is for in-coverage, and the second D2D resource is for out of coverage (OOC);
   performing, by the UE, an D2D communication with other UEs by using the first D2D resource while the UE is camping on the serving cell;
   detecting, by the UE, that the UE is OOC,
   wherein the UE is detected as an early OOC if an error rate of synchronization signal detection is beyond a third threshold which is lower than a first threshold used for detecting a normal OOC;
   after detecting that the UE is OOC, continuing, by the UE, to perform a D2D transmission with other UEs if a specific condition is met; and
   performing, by the UE, the D2D transmission by using the first D2D resource or the second D2D resource,
   wherein, if the UE detects that it is in coverage before the specific condition is met, the D2D transmission is performed by using the first D2D resource, and
   wherein, if the specific condition is met while the UE detects that it is in OOC, the D2D transmission is performed by using the second D2D resource.

2. The method of claim 1, wherein the specific condition is that a timer is running.

3. The method of claim 1, wherein the specific condition is that a measurement result is higher than a specific reference signal received power (RSRP) threshold.

4. The method of claim 1, wherein the first D2D resource is provided by the serving cell which the UE performs the D2D operation.

5. The method of claim 1, wherein the first D2D resource is provided by a cell of frequency in which the UE performs D2D operation.

6. The method of claim 1, wherein the normal OOC is detected if the UE cannot detect a synchronization signal transmitted from the serving cell or a UE serving relay functionality, or if an error rate of synchronization signal detection is beyond a first threshold.

7. The method of claim 1, wherein the normal OOC is detected if a detected if a reference signal received power (RSRP) of the serving cell or a UE serving relay functionality is lower than a second threshold.

8. The method of claim 1, wherein the normal OOC is detected based on physical layer problems or a radio link failure.

9. The method of claim 1, wherein the early OOC is detected based on physical layer problems or a radio link failure.

10. The method of claim 1, wherein the early OOC is detected if a reference signal received power (RSRP) of the serving cell or a UE serving relay functionality is lower than a fourth threshold which is higher than a second threshold used for detecting the normal OOC.

11. A user equipment (UE) configured to perform device-to-device (D2D) transmission in a wireless communication system, the UE comprising:
    a radio frequency (RF) unit configured to transmit or receive a radio signal; and
    a processor coupled to the RF unit, and configured to:
      camp on a serving cell;
      after camping on the serving cell, configure a first D2D resource and a second D2D resource,
      wherein the first D2D resource is for in-coverage, and the second D2D resource is for out of coverage (OOC);
      perform an D2D communication with other UEs by using the first D2D resource while the UE is camping on the serving cell;
      detect that the UE is OOC,
      wherein the UE is detected as an early OOC if an error rate of synchronization signal detection is beyond a third threshold which is lower than a first threshold used for detecting a normal OOC;
      after detecting that the UE is OOC, continue to perform a D2D transmission with other UEs if a specific condition is met; and
      perform the D2D transmission by using the first D2D resource or the second D2D resource,
      wherein, if the UE detects that it is in coverage before the specific condition is met, the D2D transmission is performed by using the first D2D resource, and
      wherein, if the specific condition is met while the UE detects that it is in OOC, the D2D transmission is performed by using the second D2D resource.

12. The method of claim 11, wherein the normal OOC is detected if the UE cannot detect a synchronization signal transmitted from the serving cell or a UE serving relay functionality, or if an error rate of synchronization signal detection is beyond a first threshold.

13. The method of claim 11, wherein the normal OOC is detected if a detected if a reference signal received power (RSRP) of the serving cell or a UE serving relay functionality is lower than a second threshold.

14. The method of claim 11, wherein the early OOC is detected if a reference signal received power (RSRP) of the serving cell or a UE serving relay functionality is lower than a fourth threshold which is higher than a second threshold used for detecting the normal OOC.

* * * * *